Patented July 26, 1938

2,125,212

UNITED STATES PATENT OFFICE 2,125,212

THERAPEUTIC COMPOSITION

John H. Wright, Larchmont, N. Y., assignor to Vick Chemical Company, New York, N. Y., a corporation of Delaware No Drawing. Application May 3, 1938, Serial No. 205,701

5 Claims. (Cl. 167—58)

This invention relates to new compositions adapted for use as nose drops or nasal sprays in the treatment of head colds and the like. It relates more particularly to new compositions for this purpose having an aqueous base and containing a suitable vaso-constricting agent or agents, local anaesthetics, analgesics, aromatic materials, etc., and, in addition to such conventional constituents, a small amount of a properly selected pectin to give a controlled increase in viscosity. The nature of the compositions is such that they have a viscosity which does not change greatly in the temperature range from about 40° F. to about 100° F., and the compositions have a relatively high viscosity at nasal temperatures such that they spread readily over the surfaces of the mucous membranes on contact and remain in contact with them, while at lower temperatures their viscosity is not so great as to preclude ready administration with a dropping device or spray. This application is in part a continuation of application Serial No. 171,687, filed October 29, 1937.

It has heretofore been proposed to prepare nose drops or sprays in the form of aqueous solutions of vaso-constricting agents such as water-soluble salts of ephedrine, epinephrine, and other vaso-constrictor amines, together with other materials, such as suitable antiseptics, aromatic materials, analgesics, local anaesthetics, etc.; but in general these compositions are subject to serious disadvantages in that their viscosity is such that they do not spread effectively over the surfaces of the mucous membranes on contact, nor remain in contact with them for a sufficient period of time to perform their function effectively.

In accordance with the present invention, compositions adapted for use as nose drops or sprays are provided which have an aqueous base, and which contain, in addition to more or less conventional ingredients, a relatively small amount of pectin of such nature that a 1% aqueous dispersion of it has a pH in excess of about 4.5, the compositions having a properly adjusted pH value, somewhat in excess of 4.5, advantageously between 5.0 and 8.0. Pectin of the type specified in the quantities used, and at such controlled pH values, has the property of increasing the viscosity of the compositions at nasal temperatures to an extent such that the compositions readily spread over the surfaces of the mucous membranes on contact and remain in contact with them, thus having increased therapeutic efficiency, without increasing the viscosity at room temperatures or temperatures below room temperatures, e. g., as low as 40° F., to such an extent as to cause the compositions to gel, or to preclude their ready administration with ordinary spray or dropping devices. It is an important advantage of pectin of this type that in the pH range specified for the compositions the change in viscosity of the aqueous compositions, with temperatures, at least in the temperature range of from about 40° F. to about 100° F., is not particularly great, so that an aqueous solution suitable for use as a nasal spray or nose drop having a relative viscosity, at nasal temperatures, of about 4 to 5, as compared to water, as determined by the use of a Dudley pipette, is still sufficiently fluid at temperatures down as low as 40° F. to be readily administered. While the viscosity of the compositions both at nasal temperatures and lower temperatures may be varied over relatively wide ranges, I have found it advantageous to use an amount of pectin which will impart, in the pH range in excess of about 4.5 and up to about 8.0, a relative viscosity at nasal temperatures of about 4 to about 5, as determined by the Dudley pipette, the relatively uniform viscosity over the temperature range of about 40° F. to 100° F. insuring a sufficiently low viscosity at lower temperatures to permit ready administration.

This type of pectin has the further advantages that it is relatively stable in the presence of water and other ingredients used in the nose drops and nasal sprays in the pH range used, having very little tendency to hydrolyze, and is compatible with the other constituents of the compositions. Furthermore, it is resistant to putrefactive and fermentative changes, and need not be used in large concentrations such as might result in the deposition of objectionable residues in the nasal passages. It is non-irritating.

In general, the amount of pectin which may be used with advantage ranges from about 1% to about 2% of the total compositions, although it will be appreciated that the amount of pectin used must be varied to make allowance for variations in the properties of pectin. Certain pectins of the type included in the present invention produce the desired increase in viscosity in concentrations as low as 1% or even less, at the pH range specified; whereas with other pectins, of different quality or from a different source, as much as 2% or even a little more may be required to produce the desired increase in viscosity. In any case, it is a simple matter to determine how much of any particular grade of pectin must be used to produce the desired increase in viscosity. In general, from about 1% to about 2% of pectin, when incorporated in the aqueous base, increases the relative viscosity at nasal temperatures to about 4 to 5 as determined by the Dudley pipette, which is a desirable viscosity, and, as the compositions have a relatively uniform viscosity over the temperature range from about 40° F. to about 100° F., such compositions are sufficiently fluid at the lower temperatures to permit ready administration.

The invention will be further illustrated by the following specific example, but it is not limited thereto:

An aqueous solution is prepared containing about 1% of ephedrine sulfate, 0.5% of chlorbutanol, 0.85% of sodium chloride and from 1 to 2% of pectin, depending upon the particular pectin selected, the pH of the composition being between about 4.5 and 8.0. The pectin used has a pH, in 1% aqueous dispersion, in excess of about 4.5. The resulting composition is approximately isotonic and has a relative viscosity of about 4 to 5 as measured by the Dudley pipette, produced if necessary by slight adjustment in the amount of pectin used, at nasal temperatures so that it spreads readily upon contact with the mucous membranes and remains in contact with them, thus being highly effective for the treatment of head colds and the like. At the same time, its viscosity at lower temperatures, e. g., down to 40° F., is sufficiently low so that it can be readily administered with ordinary nose droppers or sprays. If desired, one or more of the aromatics, such as thymol, menthol, eucalyptol, etc., may be added up to saturation to make the composition more pleasant when administered.

The ephedrine sulfate in the composition of the example is a vaso-constricting agent, and is the therapeutically effective ingredient. It may, of course, be replaced by other salts of ephedrine, such as the hydrochloride, or by other water-soluble vaso-constricting agents of the same general nature, such as water-soluble salts of epinephrine, phenyl and hydroxy-phenyl propanol amines, phenyl and hydroxy-phenyl ethanol amines, etc. The chlorbutanol is an analgesic, local anaesthetic and antiseptic, and may be omitted or replaced by other suitable analgesics, local anaesthetics or antiseptics. If desired, antiseptics may be added, or the composition may be varied by the inclusion of other ingredients, the present invention being directed to the use of properly selected pectin at a proper pH value for the control of the viscosity of the aqueous base composition at nasal and lower temperatures.

I claim:

1. An aqueous composition adapted for use as nose drops or nasal sprays including, in addition to therapeutic ingredients, a small amount of pectin, said pectin having, in 1% aqueous dispersion, a pH in excess of about 4.5, said composition having a pH value between about 4.5 and 8.0.

2. An aqueous composition adapted for use as nose drops or nasal sprays containing a vaso-constricting agent and a small amount of pectin, said pectin having, in 1% aqueous dispersion, a pH in excess of about 4.5, said composition having a pH value between about 4.5 and 8.0.

3. An aqueous composition adapted for use as nose drops or nasal sprays containing a salt of ephedrine and a small amount of pectin, said pectin having, in 1% aqueous dispersion, a pH in excess of about 4.5, said composition having a pH value between about 4.5 and 8.0.

4. An aqueous composition adapted for use as nose drops or nasal sprays including, in addition to therapeutic ingredients, from about 1% to about 2% of pectin, said pectin having, in 1% aqueous dispersion, a pH in excess of about 4.5, said composition having a pH value between about 4.5 and 8.0.

5. An aqueous composition adapted for use as nose drops or nasal sprays including, in addition to therapeutic ingredients, a quantity of pectin of a nature such that a 1% aqueous dispersion of it has a pH in excess of about 4.5 sufficient to impart a relative viscosity, as measured by the Dudley pipette, of from about 4 to about 5 at nasal temperatures.

JOHN H. WRIGHT.